United States Patent
Raman et al.

(10) Patent No.: US 12,164,866 B2
(45) Date of Patent: *Dec. 10, 2024

(54) DATA REUSE COMPUTING ARCHITECTURE

(71) Applicant: THE BANK OF NEW YORK MELLON, New York, NY (US)

(72) Inventors: Rajesh Raman, New York, NY (US); Aishwarya Maurya, New York, NY (US); Joanna Graper, New York, NY (US); Yi Cong Chen, New York, NY (US); Purushothaman Krishnamurthy, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,882

(22) Filed: Feb. 21, 2024

(65) Prior Publication Data

US 2024/0346241 A1    Oct. 17, 2024

Related U.S. Application Data

(63) Continuation of application No. 17/524,452, filed on Nov. 11, 2021, now Pat. No. 11,941,353.

(51) Int. Cl.
*G06F 40/186* (2020.01)
*G06F 16/18* (2019.01)
(Continued)

(52) U.S. Cl.
CPC ........ *G06F 40/186* (2020.01); *G06F 16/1873* (2019.01); *G06F 40/174* (2020.01); *G06F 40/40* (2020.01)

(58) Field of Classification Search
None
See application file for complete search history.

(56) References Cited

U.S. PATENT DOCUMENTS 7,200,806 B2    4/2007    Sahu
7,644,351 B1    1/2010    Portnoy et al.
(Continued)

OTHER PUBLICATIONS

Extended European Search Report dated Feb. 27, 2023, issued in corresponding European Patent Application No. 22206658.1 (11 pgs.).

*Primary Examiner* — Quynh H Nguyen
(74) *Attorney, Agent, or Firm* — Pillsbury Winthrop Shaw Pittman, LLP

(57) ABSTRACT

Disclosed is an improved computer architecture for generating an electronic form by having a user input a portion of form data and obtaining the remaining portion of the format data from a data storage that stores reusable data for various forms. A master data object is configured to store "request-agnostic data," which is typically that portion of form data that does not differ, or is common, between various forms. The data that differs between various forms, such as the data that is specific to a form, may be considered as "request-specific data." When a form generation request is received, the user may be prompted to input request-specific data, but not the request-agnostic data. The system automatically obtains the request-agnostic data from the master data object, and integrates the request-agnostic data with the request-specific data to generate the form.

26 Claims, 5 Drawing Sheets

(51) Int. Cl.
*G06F 40/174* (2020.01)
*G06F 40/40* (2020.01)

(56) References Cited

U.S. PATENT DOCUMENTS

| | | |
|---|---|---|
| 10,599,884 B1 | 3/2020 | Mottram |
| 2006/0197982 A1* | 9/2006 | Bell .................... G06F 40/174 |
| | | 358/1.18 |
| 2015/0248392 A1 | 9/2015 | Watanabe |

* cited by examiner

DATA REUSE COMPUTING ARCHITECTURE

CROSS-REFERENCE TO RELATED APPLICATIONS

This application is a Continuation Application of U.S. Ser. No. 17/524,452, filed Nov. 11, 2021, the subject matter of which is incorporated herein by reference in entirety.

BACKGROUND

Many software programs prompt a user to enter information via a computer. The user interfaces utilized to elicit user information are often referred to as forms. Some electronic forms are designed as web pages so that a user can access and enter data into a form using a web browser. Often times various forms may have common information, which the user may have to input repeatedly. Current computing architectures lack the ability to store such common data and to reuse the common data for integration with other data in generating various forms. Such computing architecture results in the user having to provide the data repeatedly, which is not only tedious and time consuming for a user, but also prone to faulty data due to an increased likelihood of human error. Also, if there is any change to a portion of the common data, then each of the various forms may have to be updated individually to reflect the change. The current architectures may not be capable of leveraging such common data to improve user experience in creating electronic forms. Further, storage of such common information repeatedly (e.g., with every form) results in an inefficient use of computing resources, e.g., increased consumption of memory. Furthermore, current systems do not have the capability to predict a likelihood of a particular form being certified/approved or rejected by an entity, nor do they have the capability to suggest natural language text to be included in the form to increase a likelihood of the approval/certification. Furthermore, the current systems do not have the capability to provide verifiable proofs of authenticity of the certified forms. These and other drawbacks exist.

SUMMARY

Methods and systems are described herein for an improved computer architecture for generating an electronic form by obtaining a portion of form data as user input and obtaining the remaining portion from a data storage that stores reusable data for various forms. In some embodiments, the computer architecture includes a master data object that is configured to store "request-agnostic data," which is typically that portion of form data that does not differ, or is common, between various forms that may be created by the user. For example, if the forms created by the user are of various types and subtypes and each form generation request corresponds to creating a form of a particular subtype, then data having information corresponding to a user, a type of the form, or other such information may be considered as request-agnostic data, and the data that differs between various forms, such as the data in the form generation request that corresponds to the particular subtype may be considered as "request-specific data." When a form generation request is received for generating a form of a first subtype of a first type, the user may be prompted to input request-specific data (e.g., form data having information corresponding to the first subtype), but not the request-agnostic data. The system automatically obtains the request-agnostic data (e.g., information corresponding to the form type) from the master data object, and integrates the request-agnostic data with the request-specific data to generate the form of the first subtype of the first type.

Some aspects include a form workflow process in which the generated form is automatically sent to one or more concerned entities for verification, approval, or certification of the form.

Some aspects include prediction models which are configured to determine a likelihood of approval or certification of the forms by the concerned entity. In some embodiments, the prediction models may also generate recommendations or suggestions of natural language text to be included or revisions to the natural language text included in the form to increase a likelihood of the approval of the form by the concerned entity.

Some aspects include a decentralized computing platform, such as a blockchain-based computing platform, by which example aspects of the above-mentioned processes may be implemented. For example, the decentralized computing platform may be configured to store certified forms and to provide verifiable proofs of authenticity of the certified forms to users of the decentralized computing platform.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRA WINGS

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

Figure 1:
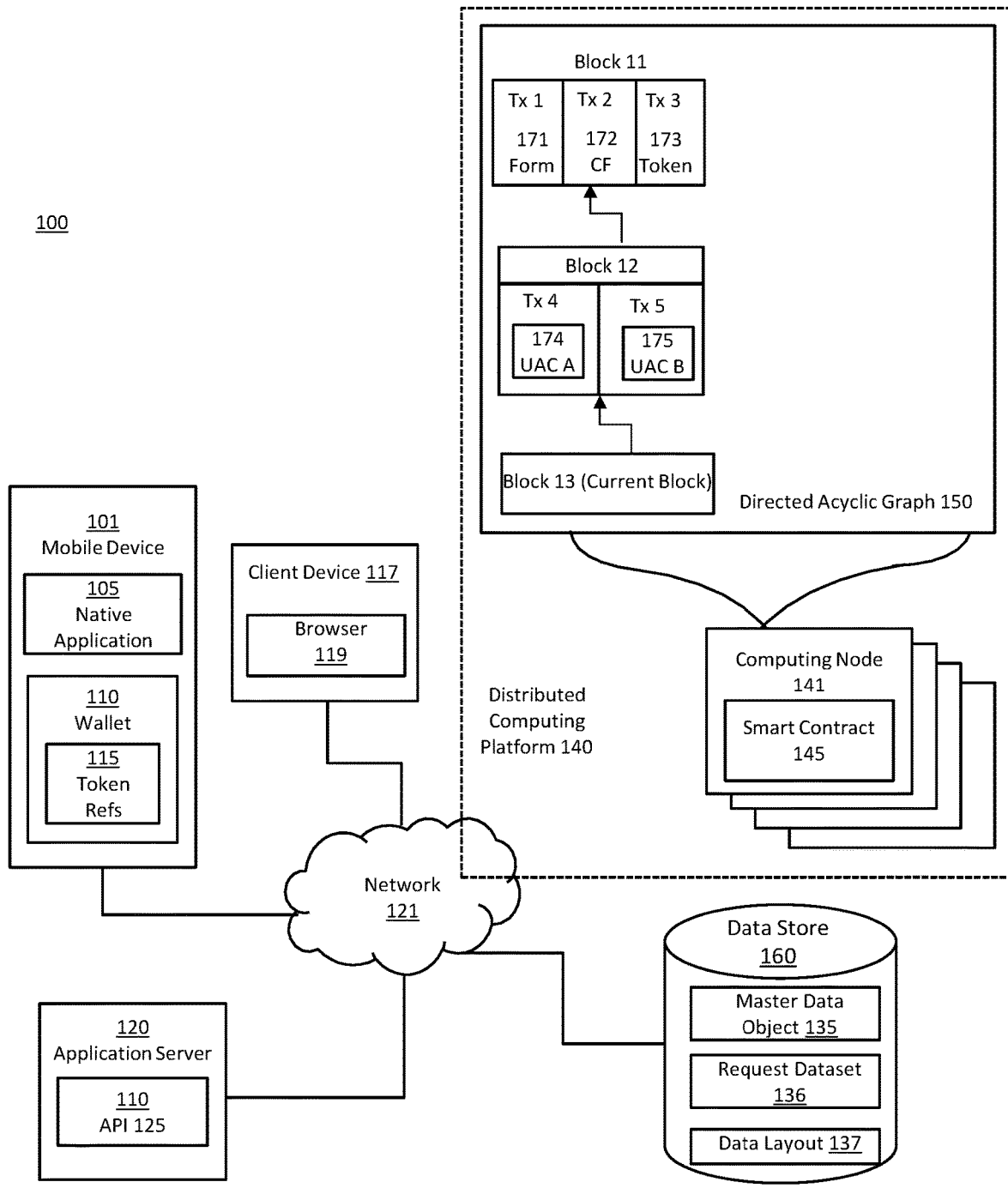
FIG. 1 shows a system for facilitating generation of electronic forms using data reuse computing architecture, in accordance with one or more embodiments.

FIG. 1 shows a system 100 for facilitating generation of electronic forms using data reuse computing architecture, in accordance with one or more embodiments. For example, system 100 may comprise an improved processing architecture, such as a data reuse computing architecture. In particular, system 100 may include a new function routine that configures a master data object 135 to store request-agnostic data, which is typically that portion of form data that does not differ, or is common, between various electronic forms that may be created by a user. The new function routine may automatically integrate the request-agnostic data with request-specific data obtained from a form generation request, which may be different for different forms, to generate an electronic form. As shown in FIG. 1, system 100 may include an application server 120, client device 117, mobile device 101, decentralized computing platform 140 having multiple computing (e.g., peer) nodes 141, data store 160, or other components. The application server 120 may be a computing device, such as the one described with reference to FIG. 5, or collection of computing devices associated with a trusted party that provides form generation services or other services described herein. As shown, the application server 120 may include an application programming interface (API) 125 for providing electronic form related services. An example mobile device 101 may be a mobile computing device (e.g., a portable device, such as a laptop computer, a tablet computer, a hand-held computer, other computer equipment). An example client device 117 may be a computing device like a laptop, desktop, or workstation operated with network 121 access in a home, office, or field environment. The client device 117 may provide user access to functionality of the system 100 via a browser 119, like a web browser application, which may access a website that provides functionality similar to that of the native application 105 (e.g., as described above). For example, the website may be a website hosted by the application server 120, and which may be serviced by API 125, to provide and receive information via one or more user interfaces of the website.

A component of system 100 may communicate with one or more components of system 100 via a communication network 121 (e.g., Internet, a mobile phone network, a mobile voice or data network, a cable network, a public switched telephone network, or other types of communications network or combinations of communications networks). The communication network 121 may be a wireless or wired network. As an example, the client device 117 may interact with the application server 120 via the above described communication network. As another example, the client device 117 and the application server 120 may communicate wirelessly.

It should be noted that, while one or more operations are described herein as being performed by particular components of the system 100, those operations may, in some embodiments, be performed by other components of the system 100. As an example, while one or more operations are described herein as being performed by components of the application server 120, those operations may, in some embodiments, be performed by components of client device 117.

It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 facilitates generation of electronic forms using a data reuse computing architecture. In the data reuse computing architecture, the system 100 allows a user to generate an electronic form (e.g., a graphical user interface (GUI), a document, a report or other such records) by inputting a portion of form data specific to the form being generated (referred to as "request-specific data"). The system 100 obtains the remaining portion of the form data from a master data object 135 that is configured to store data that typically does not differ, or is common, across various forms (referred to as "request-agnostic data"). While the request-specific data is input by the user in every form generation request for generating a specific form, the request-agnostic data may not be input by the user in every form generation request. For example, the user may provide the request-agnostic data prior to issuing any form generation request and the system 100 would store the request-agnostic data in the master data object 135 to be automatically retrieved and integrated with request-specific data for every subsequent form generation request issued by the user. By storing the request-agnostic data in the master data object 135, the request-agnostic data may be reused in generating multiple forms, thereby preventing the user from having to input the request-agnostic data with every form generation request, and thus improving a user experience and minimizing any faulty data in a form due to human error.

The content of the request-agnostic data or the request-specific data may be customized for various types of applications. In some embodiments, if the forms being generated are of various types and subtypes, and each form generation request differs in the subtype of the form being generated, the system 100 may be configured to store (a) information associated with a user (e.g., user profile data such as contact information of the user, user identification, organization information of the user, etc.) and information associated with the types of forms (e.g., a first type, a second type, information describing various aspects of the types of forms, or such information) as the request-agnostic data, and (b) information associated with a particular subtype of the form being generated as request-specific data. For example, if the form generation is being implemented in a computer system that facilitates generation of a bond-issuance request form associated with an issuance of the bond, the request-agnostic data may include information associated with an issuer of the bond (e.g., identification information of the issuer, including user profile data, such as an organization name, contact information of personnel of the organization, address, or other such information) and information associated with form types (e.g., standards bodies with which the bond complies), information corresponding to how the bond complies with each of the standards bodies, or other such information. The user may issue different form generation requests for different bond issuances, and each form generation request may generate a bond-issuance request form for the corresponding bond issuance. The request-specific data may include information associated with the subtype (e.g., an outcome or category within a standards body) of a specific bond issuance for which the generation of bond-issuance request form is being requested. The request-specific data may also include information describing how the bond is directed to such an outcome or category, identification information of a verifying entity that verifies the bond-issuance request form with the standards body guidelines, or other such information. As described above, the content of request-agnostic data and request-specific data may be customized based on the application for which the form generation is being implemented. However, the benefits of the data reuse architecture in form generation process may be maximized in any application by storing that portion of form data that typically does not differ, or is common, across various forms as request-agnostic data.

The following paragraphs describe generation of master data object 135 for reusing request-agnostic data in generation of forms. The application server 120 provides multiple services (e.g., via API 125) that the users may use to access the electronic forms. For example, the application server 120 may provide a request-agnostic data generation service that allows the users to input request-agnostic data. The users may access the request-agnostic data generation service via a native application 105 or website accessible via a browser 119 of a client device 117, which invokes a corresponding API 125 to execute the service. As described above, the request-agnostic data may include information associated with a user and information associated with the types of forms. The request-agnostic data generation process may involve creation of user accounts for the users to provide information associated with users. In some embodiments, users may register with the system 100, such as by creating an account associated with the user. In some embodiments, creating an account may include creation of one or more accounts (e.g., a user may have an account with the application server 120 and an account, like a wallet, established on the platform 140). A user account may be associated with a username and password (or other such credentials), contain user identifiable information (such as name, contact information, or other information associated with or descriptive of an entity such as a human user or an organization), other such information some of which is provided by the user during account creation process.

The request-agnostic data generation service may also require the user to submit information associated with the types of forms. In some embodiments, the information associated with the types of forms may have information describing various aspects of the types of forms. Continuing with the above example of bond issuance application, the information associated with user may include information associated with an issuer of the bond (e.g., organization information of an organization issuing the bond), and the information associated with form types may include information associated with standards bodies with which the bond complies, information corresponding to how the bond complies with each of the standards bodies, information describing aspects of the standards bodies with which the bond complies, or other such information. In some embodiments, the request-agnostic data, or at least a portion of it, may be input as natural language text. In some embodiments, the information provided in the request-agnostic data may have a bearing on a determination of whether a form generated using the request-agnostic data is certifiable or not from a certification authority.

After the user submits the request-agnostic data, the request-agnostic data generation service stores the request-agnostic data in a master data object 135, which may be persisted in a data store 160. The master data object 135 may be implemented as a data structure (e.g., a database table) to hold the request-agnostic data. In some embodiments, the master data object 135 may store the request-agnostic data in the data store 160 as one or more database tables. For example, the master data object 135 may be configured to store (a) a portion of request-agnostic data that is related to a user (or that is agnostic to a type of the form) in a first database table, and (b) a portion of request-agnostic data that is specific to a type of the form in a second database table that is configured to exclusively store data for the corresponding type (e.g., if the user has subscribed to "3" types of forms, then "3" different tables are generated in which each table is configured to store data corresponding to "1" of the "3" types). In some embodiments, each entry in the first table may have information such as a user ID of the user, a version number of the master data object 135, information associated with the user or other information that is agnostic to a type of the form, an indicator of the types of forms to which the user subscribes to, or other such information. In some embodiments, each entry in the second table may have information such as a reference to the user ID of the user and a version number of the master data object 135, information associated with a type of the form to which the table corresponds, or other such information. In some embodiments, the master data object 135 may store the request-agnostic data for one or more users.

In some embodiments, the user may update (e.g., add, modify, or delete) information in the request-agnostic data. The application server 120 may provide version management services, which may create a new version of the master data object 135 when the request-agnostic data in a current version of the master data object 135 is updated. For example, the user may change (e.g., add) the type of form the user subscribes to, and the application server 120 generates a new version of the master data object 135 and stores the new version as a separate copy of the master data object 135. The old version of the master data object 135 may be retained as well, e.g., stored in another table such as an audit database table. In some embodiments, each of the first table and the second table may have an associated audit table that is configured to store older versions of the records stored in the corresponding table whenever the master data object 135 is updated. Further, in some embodiments, the user may "save" any changes to the master data object 135 but not "submit" the changes. Typically, submitted changes are used in generation of the forms and not the saved changes. Accordingly, the application server 120 may indicate whether the changes to the master data object 135 are saved or submitted. In some embodiments, the application server 120 may use a first versioning format to indicate submitted changes and a second versioning format to indicate saved changes. For example, when the user submits the changes to the master data object 135, the version number may be increased monotonically (e.g., 1.0, 2.0, 3.0 or so on), whereas saved but not submitted changes may have version number increasing in a tenth place of the actual version number (e.g., 1.1, 1.2, 2.1, 2.2 and so on). In some embodiments, the data store 160 may have multiple versions of the master data object 135 submitted by the user. When a form is being generated, the application server 120 may use the request-agnostic data from the latest version of the master data object 135 to integrate with request-specific data for generating the form.

In some embodiments, the application server may provide conflict resolution service (e.g., via API 125), that resolves a conflict when two or more users are editing form data (e.g., request-agnostic data or the request-specific data) that is not submitted yet. The conflict resolution service may use a wide variety of conflict resolution techniques in resolving the conflicts that may arise when multiple users are editing unsaved or unsubmitted form data simultaneously. For example, in a first method, the conflict resolution service may enforce a write lock on the form data when a first user starts editing the form data so that a second user may not edit the form data until the first user saves or submits the form data. In a second method, the conflict resolution service may allow a user who was first to edit to save or submit the form data. In a third method, the conflict resolution service may accept the form data from a user who is first to save or submit the form data.

The request-agnostic data generation process may also associate a user account with a user role. In some embodiments, a user role defines the various services of the application server 120 that are available to the user. For example, a first role may allow a user to generate electronic forms (e.g., issuer in the bond issuance example), a second role may allow a user to verify compliance of a form with pre-defined guidelines associated with a particular type or subtype of the form (e.g., user associated with verifying entity in the bond issuance example), or a third role (e.g., user associated with the standards body in the bond issuance example) may allow the user to approve or certify the form based on the compliance of the form with the pre-defined guidelines.

In some embodiments, the application server 120 may provide a form generation service that allows the users to issue a request for a generating a form. The users may access the form generation service via a native application 105 of the mobile device 101 or a website accessible via a browser 119 of a client device 117, which invokes a corresponding API 125 to execute the service. In some embodiments, since the system 100 is implemented using a data reuse computing architecture, the form generation service may prompt the user to input data specific to the subtype of the form being created (e.g., request-specific data having information corresponding to a subtype) but not the request-agnostic data (e.g., as the request-agnostic data will be automatically integrated with the request-specific data prior to generating the form). For example, in response to receiving a form generation request from the user, the application server 120 may generate a GUI which is accessible via the browser 119 or the native application 105 prompting the user to input request-specific data (e.g., information corresponding to a subtype of the form being generated). The GUI may present a list of form types subscribed to by the user and available subtypes with each of the form types. The user may select the subtypes and input any other information associated with the selected subtypes (e.g., information describing various aspects of the selected subtypes). Continuing with the above example of bond issuance application, the form generation request may correspond to generation of a bond-issuance request form for issuance of a specific bond, the request-specific data to be input by the issuer may include (a) an outcome or category (e.g., subtype) within a standards body to which the specific bond issuance is requested, (b) information describing various aspects of the outcome or category, (c) information describing how the specific bond is directed to such an outcome or category, (d) identification information of a verifying entity that verifies the bond-issuance request form, or other such information. In some embodiments, the request-specific data, or at least a portion of it, may be input as natural language text. In some embodiments, the information provided in the request-specific data may have a bearing on a determination of whether a form generated using the request-specific data is certifiable or not from a certification authority.

After the user submits the form generation request, the application server 120 may store the request-specific data as form request data 136 in the data store 160. Further, in response to the submission of the form generation request, the form generation service may generate the form (e.g., an electronic document or other GUI) by integrating the request-agnostic data from the master data object 135 with the request-specific data from the form request data 136. For example, the form generation service may obtain the request-agnostic data associated with the user from the latest version of the master data object 135 and integrate it with the request-specific data from the form request data 136 to generate the form of a particular type and subtype. Continuing with the example of bond issuance, after the user submits the form generation request by inputting the request-specific data (e.g., an outcome or category within a standards body of the specific bond issuance with which the request is associated, information describing various aspects of the outcome or category, identification information of a verifying entity that verifies the bond-issuance request form, or other such information), the form generation service obtains the request-agnostic data from the latest version of the master data object 135 (e.g., organization information of an organization issuing the specific bond, information associated with standards bodies with which the specific bond complies, information describing aspects of the standards bodies with which the bond complies, or other such information) integrates both the data and generates the bond-issuance request form.

Similarly, when the user issues a subsequent second request to generate a second form of a second type and a second subtype, the form generation service integrates the request-specific data of the second request with the request-agnostic data from the master data object 135 to generate the second form. The above process improves a user experience in creating the forms by preventing the user from inputting redundant data. Further, the above process also minimizes the likelihood of the form having faulty data due to human error. For example, if a form has "7" sections to be input by the user, and "3" sections correspond to request-agnostic data and "4" sections correspond to request-specific data, then every time the user issues a request to generate a form, the user may have to input data for the "4" sections corresponding to the request-specific data and the remaining "3" sections are automatically completed by the system 100.

In some embodiments, like the request-agnostic data, the form generation request may be saved or submitted. When the request is submitted, the form generation process stores request-specific data in the data store 160 as the form request data 136 and proceeds with generating the form by integrating the request-agnostic data and the request-specific data associated with the request. When the request is saved, the request-specific data is stored in the data store 160 as the form request data 136 but a form is not generated. The user may obtain the saved request from the data store 160 for completing and submitting at a later point of time to generate the form. In some embodiments, the form request data 136 may be stored in the data store 160 using a data structure (e.g., database tables).

In some embodiments, the application server 120 provides a workflow service that facilitates an approval of a form (e.g., a form generated using the form generation service). In some embodiments, after the form is generated, the workflow service may send a notification to another entity (e.g., a verifying entity or a certification authority) to perform an action associated with the form (e.g., review, verify, approve or reject the form). Continuing with the example of bond issuance, upon generation of the bond-issuance request form, the workflow service may send a notification (e.g., via email, text message to a mobile device, in-app notification on the mobile device, in a GUI corresponding to the workflow service) to a user associated with a form verification organization. The verifying user may access the bond-issuance request form via a browser 119 or a native application 105, which invokes the API 125 corresponding to the workflow service. The verifying user may perform a number of actions associated with the form, such as indicate whether the form is likely to be approved or rejected by a certification authority. The verification authority may also provide comments to the bond-issuance request (e.g., reason why the bond-issuance request may be rejected, recommended changes to increase a likelihood of approval, etc.). In some embodiments, the workflow service may provide the verifying user access to the guidelines (e.g., associated with the standards body) based on which the certifying authority may certify the form. If the verifying user rejects the bond-issuance request form, the workflow service may notify the issuer regarding the rejection and return the bond-issuance request form to the issuer to make the necessary changes to the bond-issuance request form. Upon approval by the verifying user, the workflow service may automatically send a notification to a user associated with a certification authority (e.g., standards body) regarding the bond-issuance request form. The certifying user may perform a number of actions associated with the form, such as approve/certify or reject the bond-issuance request form. The certifying user may also provide comments to the bond-issuance request form (e.g., reason why the bond-issuance request is rejected, etc.). If the certifying user rejects the bond-issuance request form, the workflow service may notify the issuer regarding the rejection and return the bond-issuance request form to the issuer. Upon approval by the certifying user, the workflow service may send a notification to the issuer regarding the certification of the bond-issuance request form.

In some embodiments, the workflow service provides a GUI that provides a list of forms generated by the user and a current workflow status of the forms. Further, the GUI may also display the list of forms based on a role associated with the user. For example, when a user with a first role, such as an issuer, accesses the GUI, the GUI may display all the forms generated by the user and their respective workflow status (e.g., form created, verification pending, verified, verification unsuccessful, certification pending, certified, certification rejected, or other such status). When a user associated with a second role, such as a verifying user, accesses the GUI, the GUI may display the list of forms associated with the verifying user and their workflow status (e.g., verification pending, approved or rejected). Similarly, when a user associated with a third role, such as a certifying user, accesses the GUI, the GUI may display the list of forms associated with the certifying user and their workflow status (e.g., certification pending, certified or rejected). In some embodiments, the workflow status may be stored in the data store 160 (e.g., with the form request data 136).

In some embodiments, the identification information (e.g., email, Internet Protocol (IP) address, application ID, user account information, or other information) of an entity participating in the workflow may be provided to the system 100 in various ways. For example, the identification information may be provided using the workflow service, in the request-agnostic data, or in the request-specific data.

In some embodiments, the application server 120 may also provide summary generation service that generates an executable code, which when executed, generates a master form that provides a summary (e.g., a portfolio) of approved forms associated with the user and the information associated with each of the forms. In some embodiments, the executable code obtains the request agnostic data from the master data object 135 and the request-specific data for each of the approved forms (e.g., certified forms) from the form request data 136, integrates the request-agnostic data with the request-specific data of each of the forms to generate a master form (e.g., a GUI) that provides information regarding each of the approved forms. In some embodiments, the master form is encoded in a standardized format. For example, the master form is encoded in JavaScript object notation (JSON), which comprises key-value pairs that encode fields and values of the fields (e.g., information) extracted from the master form. The user may access the master form by executing the executable code, which generates the master form using the JSON code.

In some embodiments, the application server 120 provides a prediction service (e.g., via the API 125) that predicts a likelihood of approval of a form by an approving entity. For example, the prediction service may use natural language processing (NLP)-based prediction models to generate a prediction indicating a likelihood of approval or rejection of a form. In some embodiments, the prediction model is trained to generate the prediction. For example, the training process may include obtaining a training set having form data (e.g., request-agnostic data or request-specific data) of all the forms (e.g., associated with a specific user or a number of users) that have been identified as approved and inputting the training set to the prediction model. In some embodiments, the training is an iterative process and each iteration may include the prediction model determining a predicted output of a particular form (e.g., approved or rejected), comparing the predicted output with the actual label or result of the form (e.g., approved), determining a loss function that is indicative of a difference between the predicted output and the actual label, adjusting parameters of the prediction model (e.g., weights or biases) to reduce the loss function. The training may be continued until the loss function is minimized (e.g., reaches a threshold value or a threshold number of iterations are performed). After the training process concludes, the prediction model is considered to be trained, and the trained prediction model may be used to predict a likelihood of approval of any given form. Continuing with the example of bond issuance, an issuer may use prediction service to determine a likelihood of certification of the bond-issuance request form from the certification authority. The prediction service may input the form data (e.g., natural language text from the request-agnostic data or the request-specific data) associated with the bond-issuance request form to the prediction model to obtain a prediction of a likelihood of certification of the bond-issuance request form by the certification authority. In some embodiments, the prediction model may generate the prediction as a classification by classifying the bond-issuance request form into "certifiable" or "non-certifiable." In some embodiments, the prediction model may generate the prediction as a probability of approval (e.g., 90% likelihood that the bond-issuance request form is certified). The prediction may be provided as an output to the user via a GUI (accessible via the browser 119 or the native application 105) associated with the prediction service.

Various architectures of prediction models may be used in predicting whether the form will be approved or rejected by the certifying authority. For example, in cases where the available training data is sparse (e.g., less than a threshold amount, such as in cases where training data is restricted to a user and cannot be obtained across users), Siamese network with triplet loss based prediction model may be implemented to perform the prediction. In a Siamese network based prediction model, input text data is converted into embeddings (vector representations of the text in Euclidean space where distance corresponds to the similarity measure) and the prediction model is trained in such a way that embeddings generated by the prediction model for the same class should appear closer to each other and embeddings for a different class should appear farther. In the context of the prediction of a likelihood of an approval of a form, the prediction model is trained in such a way that embeddings generated by the prediction model for form data (e.g., natural language text derived from the request-agnostic data or the request-specific data) of two or more forms that are identified as approved appear closer than with the embedding of forms that are identified as rejected. The prediction model is trained using a loss function such as the triplet loss, which computes (a) a distance between an anchor example (e.g., a form that is identified as certified) and a positive example (e.g., a form that is identified as certified) and (b) a distance between an anchor example (e.g., a form that is identified as certified) and a negative example (e.g., a form that is identified as rejected). The loss function may be represented as:

$$L = \max(d(a, p) - d(a, n) + \text{alpha}, 0),$$

Where d(a, p) is the distance between an anchor example and a positive example, d(a,n) is the distance between an anchor example and a negative example, and alpha is a margin that defines how far away the two distances should be. The objective of the prediction model is to minimize the loss function, e.g., minimize d(a, p) and maximize d(a, n). The following describes the training process of the Siamese network based prediction model.

In some embodiments, three sets of training data are obtained. For example, a first training set, termed as anchor examples, may include form data (e.g., natural language text derived from the request-agnostic data or request-specific data) of a number of forms identified as certified by a certifying authority. A second training set, termed as positive examples, may include form data (e.g., natural language text derived from the request-agnostic data or request-specific data) of a number of forms identified as certified by a certifying authority. In some embodiments, the first training set and the second training set may have form data of at least some of the same forms. In some embodiments, the first training set and the second training set may not have the form data of the same forms. A third training set, termed as negative examples, may include form data (e.g., natural language text derived from the request-agnostic data or request-specific data) of a number of forms identified as rejected by a certifying authority. In each iteration of the training process, "3" training examples—one from each set—anchor, positive and negative, are input to the prediction. The loss function, such as the triplet loss described above, is computed, parameters of the prediction model (weights or biases) are adjusted to minimize the loss. The prediction model over a course of time (e.g., a predefined number of iterations) may bring the embeddings of anchor and positive closer in the embedding space while pushing the embedding of negative far apart using the triplet loss. After the loss function is minimized (e.g., reaches a threshold value) or a predefined number of iterations are performed, the prediction model may be considered to be trained. The trained prediction model may be used to predict a likelihood of approval of any given form, as described above.

In some embodiments, the prediction service may implement yet another prediction model (e.g., a generative prediction model) that is configured to predict text (e.g., recommend text or recommend a revision to the text input by the user) to increase a likelihood of approval or certification of the form by a certifying authority. The prediction service may implement a generative prediction model, such as Generative Pre-trained Transformer 3 (GPT-3), that generates or predicts text. In some embodiments, a GPT-3 based prediction model is an autoregressive language model that uses deep learning to produce human-like text. The generative prediction model may be an algorithmic structure designed to take one piece of language (an input) and transform it into what it predicts is the most useful following piece of language for the user. Such a prediction model may be a pretrained prediction model, which is trained using a process known as generative pre-training with wide variety of content (e.g., corpora of textual content available from the Internet, such as Wikipedia, books, or other such content) for predicting text. To learn how to build language constructs, such as sentences, the prediction model may employ semantic analytics-studying not just the words and their meanings, but also gathering an understanding of how the usage of words differs depending on other words also used in the text. Such pre-trained models may be further primed or fine-tuned for performing a specific task. For example, by providing form data (e.g., natural language text derived from the request-agnostic data or the request-specific data) associated with forms that are identified as certified as examples to the pre-trained prediction model, the prediction model may be configured to predict text that is likely to increase a likelihood of the form being certified. For example, when the user is inputting form data (e.g., request-agnostic data or the request-specific data), the prediction service may output the next one or more words or phrases to be included for increasing a likelihood of approval of the form by a certification authority. The user may choose to accept or ignore the predicted text.

In some embodiments, a prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal surpasses the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, the application server 120 provides tamper-evident data storage services (e.g., via the API 125 and the distributed computing platform 140) for the forms. In some embodiments, the distributed computing platform 140 may be implemented with a decentralized computing architecture, for instance, on a blockchain-based computing platform, like Ethereum, Cardano, NEO, hyperledger, or using a similar blockchain-based protocol.

In some embodiments, the platform 140 is executed by virtual machines (e.g., peer-node applications of Ethereum or Hyperledger) executing on a collection of computing devices (e.g., computing nodes 141) like those described with reference to FIG. 5. In some cases, the computing devices 141, respectively executing an instance of a peer-node application, collectively execute each invocation of a smart contract 145 (e.g., comprising a body of computer program code) to determine an output, e.g., based on a consensus output determined with a consensus algorithm, like Paxos, Raft, HotStuff, etc. Some outputs or information indicative of outputs determined by a smart contract, among other data, may be stored within one or more records within a data structure comprising tamper-evident properties, such as a directed acyclic graph 150.

The platform 140 of the system 100 may implement (e.g., via a plurality of participant computing nodes) a decentralized data store, which may be a blockchain-based decentralized data store. Some aspects of the disclosed embodiments may be implemented using a blockchain-based computing platform, like Ethereum, Cardano, NEO, hyperledger, or using a similar blockchain-based protocol. For example, any transaction data associated with submission of a form for certification (e.g., form ID, user ID, transaction ID, etc.) may be stored in a blockchain-based data repository, which is a decentralized data store. For example, FIG. 1 illustrates an example of a decentralized data store as a directed acyclic graph 150. The example directed acyclic graph 150 may include a number of blocks, e.g., blocks 11-14, where each next block references a prior block so as to form a chain of blocks or "blockchain." Each block may include a number of records (e.g., which may store information about, or correspond to forms, certified forms, tokens associated with certified forms, or smart contracts 145). Although not shown, records within a block may be stored within one or more nodes. Conceptually, those nodes storing transaction records may be visualized as leaf nodes within a tree-like structure, like a binary tree, or binary Merkle tree (or Radix tree), having a root node and a plurality of intermediate parent nodes, whereby each leaf node may be referenced to the root node via a plurality of references through intermediate parent nodes, or one or more linked lists of nodes. In some embodiments, references are pointers indicative of a location of some data stored within the decentralized data store. In some embodiments, references are associated with a hash, like a cryptographic hash, based on information stored in the node to which the pointer points, to afford a tamper-evident storage scheme. Or other types of cryptographic accumulators may be used for proof of membership. In some embodiments, references are hash pointers, which may be cryptographic hash pointers, and the references themselves may afford a temper-evident storage scheme.

Example computing devices 141 of a platform 140 that includes a collection of computing devices each executing peer compute nodes of a blockchain-based computing platform may host (e.g., a local version of) a blockchain ledger or other tamper-evident decentralized data structure, such as directed acyclic graph 150, upon which determinations made by respective computing nodes may be based. Collectively, the computing devices 141 (e.g., a majority, in accordance with a consensus protocol) may agree on an authoritative version of the graph 150 (or changes thereto) and update local representations thereof. In example embodiments where computing nodes 141 are part of a platform 140 comprising many computing nodes it should be recognized that a computing device participating within the context of the form generation process need not communicate with any one specific node. Rather, each may communicate with a different one/multiple of the computing nodes of the platform and also may communicate with different ones of the nodes at different times. Further, in some embodiments, one or more of the application servers 120 may be a computing node or incorporate all or some computing node functionality, thereby operating as part of the decentralized computing platform or configured to communicate with at least some of the nodes (e.g., to submit or retrieve data, not substantially process data).

In some embodiments, computing nodes, like example computing node 141, may operate upon various types of information stored within the decentralized data store of the computing platform 140. Examples include a directed acyclic graph 150 of cryptographic hash pointers, such as a blockchain or other tamper-evident, immutable, decentralized data stores. Other examples include various scripts in a scripting language executable by the computing node 141, for instance with verifiable computing, such that no single computing node 141 needs to be trusted. In some embodiments, these scripts or programs may be referred to as smart contracts 145, a term which should not be confused with a contract or agreement in law, finance, or other similar instrument. Rather, smart contracts 145 refer to programs executable by computing nodes to perform one or more functions, e.g., like an application, with the context of the platform 140 in a consistent manner, and those programs in some cases may be tamper-evident, immutable decentralized programs. A smart contract 145 can be a contract in the sense that the logic of the smart contract is immutable in some implementations once loaded to the decentralized computing platform and thus serves as a form of a commitment to a particular body of logic. As a result, a given smart contract 145 may be executed by any one computing node and execution of that smart contract should provide a same result for given inputs as some other computing node (and thus, in some embodiments, affording verification of that result by one or more (e.g., in a consensus) of the other computing nodes). For example, a smart contract 145 may be stored within the decentralized data store, loaded by a computing node 141 into a memory of the computing node, and executed to perform one or more functions according to the script or program defined by the smart contract. For example, the application server 120 may publish a smart contract 145 to the computing platform such that computing node 141 (among other ones of the nodes) may process information stored in the directed acyclic graph 150, or other information, to perform one or more functions according to one or more operations enumerated in the smart contract 145.

The term "immutable" should not be read to require that immutable data be written to a form of physical media that prevents subsequent writes (e.g., a ROM or write-once optical media). Rather, the term "immutable" refers to a data structure that does not support modifications to data once written. In some cases, this feature is afforded by making the data structure tamper evident, e.g., computationally infeasible to modify committed data without rendering the data structure internally inconsistent. In some cases, the data structure computational infeasibility of undetectable modifications may be afforded by chaining the above-described cryptographic hash values, such that verification of tampering consumes less than 100,000th of the computing resources (e.g., in time or memory complexity) of computing resources needed to modify the data structure to be consistent with a modified previously written record.

In some embodiments, one or more smart contracts 145 may be stored in the directed acyclic graph 150 or otherwise published to this data repository, or in some cases, the smart contracts may be stored in a different tamper-evident, immutable, decentralized data store from that of the data upon which the smart contracts operate. One example smart contract 145 is shown, but it should be emphasized that there may be, and in some commercial implementations likely will be, multiple instances smart contracts with variations to implement new or different logic. Further, in some cases, the smart contracts may be composed of or reference other smart contracts or invoke or draw upon logic implemented outside of the decentralized computing platform. For example, a smart contract for performing a process like that described with reference to FIG. 5 may, in some instances, call to another smart contract or interface with the outside world relative to the decentralized computing platform 140 (e.g., via an application server 120) to obtain (or verify) data upon which one or more functions of the smart contract operate.

In some embodiments, smart contracts, like smart contract 145, may be callable by the various participant entities of the system 100. Additionally, an application functionality provider, such as the application server 120, may publish new smart contracts that provide application functionality within the context of the platform 140 and are callable by various components or the application server. In some embodiments, the smart contracts may have an address, for instance, in a data storage address space of the platform 140, like an address, such as a cryptographic hash address corresponding to a node or record comprising program code of the respective smart contract. In some embodiments, a smart contract may accept arguments, such as various variables that may be passed to the smart contract and which may be operated upon by logic of the smart contract. Examples of arguments and their variables may include references, like an address, to data within the decentralized computing platform or data for storage within the decentralized computing platform. In some cases, each smart contract may have a respective application program interface with a schema defined in a record of the corresponding smart contract that enumerates arguments that are required, arguments that are optional, default values for arguments, types of those arguments, and the like.

In some embodiments, an address of a smart contract 145 may be called with an API call (e.g., to the platform 140, such as to one or more computing nodes 141) including input parameters specified in accordance with the schema of the smart contract. In some embodiments, the computing nodes 141 may respond to the API call by accessing the smart contract specified by the address, optionally verifying the smart contract, executing the smart contract based on the input parameters, and recording the results to the blockchain. This, in some cases, may include calculating a cryptographic hash value based on input parameters (e.g., which may include one or more forms, user account information, etc.) or a cryptographic hash value of records in the blockchain. Results may be stored in the blockchain and this process may be repeated for subsequent calls to execute a smart contract 145. For example, a record (e.g., by a Transaction, Tx 1 in block 11) corresponding to a form 171, a record (e.g., by Tx 2) corresponding to a certified form CF 172 that is certified from a certification authority, or a record (e.g., by Tx 3) corresponding to generation of a token 173 associated with a certified form (e.g., token corresponding to a bond issuing out of a certified bond-issuance request), may be stored within the blockchain. A generated token may be assigned, such as indicated by a transaction Tx 4 in block 12, to a user account A 174, such as a user account A corresponding to an owner of the certified form (e.g., issuer of the bond corresponding to the token). The user of user account A 174 may transfer the token, such as indicated by a transaction Tx 5, to a user account B 175 (e.g., of another user who has invested in the bond corresponding to the token), thereby conveying possession of the token to another user. Information associated with the transactions, which may reference prior records of transactions, may thus indicate a chain of possession of the token (e.g., back to its creation), among other data pertaining to the token as described herein. Embodiments may interrogate these records to verify authenticity, e.g., by recreating the calculation of the cryptographic hash values along each link in a chain of cryptographic hash pointers and comparing the recalculated values to the values in the chain to confirm (by virtue of matches) that the records are authentic (e.g., to verify current ownership of a token by a given user account, information about the certified form to which the token corresponds, or other information pertaining to the token or the form).

A tokenization service implemented by a smart contract 145 executed by participant computing nodes 141 of the platform, generates a token for the form upon submitting the certified form for tokenization. In some embodiments, the certified form may be submitted for tokenization when a form is generated and certified by a certification authority (e.g., when a bond-issuance request form is certified by a standards body). Once the token is generated, the token may be provided or issued to an account (e.g., like a wallet address) of a user (e.g., user associated with the form). The tokens may be held in a digital wallet of a user, which may be viewed on a user's device or otherwise accessed (e.g., via a website). In some examples, a user may access a wallet 110, either as a standalone application, or component of the native application 105, on their personal user device (such as their mobile device 101). Each token may be unique, and references to tokens, such as token identifiers, or other information about the respective tokens transferred to a digital wallet of the user may be viewed as assets (e.g., representations of tokens or forms corresponding to tokens owned by the user account and) tracked within the wallet 110 of the user (e.g., token identifiers 115).

In some embodiments, information regarding a form may be stored within the data store, such as directed acyclic graph 150, such as in a record. The record may be structured in accordance with a given schema, such as a schema of information for input into a smart contract 145 by which a token, may be generated. The record of the generation of the token may be stored within the data store, and may include information like a token identifier and an account to which the token was transferred (e.g., to a user associated with the certified form, such as initially, or other account of a user such as when the form user trades for the token). The smart contract(s) associated with the token may perform one or more verifications (e.g., of records within the data store to verify ownership and availability of funds) and effectuate the transaction Tx 5 recording the transfer as well as distribute the funds from the sale accordingly (e.g., by one or more other transactions or as indicated within transaction information associated with Tx 5).

In some embodiments, a directed acyclic graph 150 comprises cryptographic hash pointers to provide a tamper-evident, immutable, decentralized data store to which the smart contracts are stored and to which transaction records accessed by the smart contracts are stored, which in some cases may include results determined by the smart contracts as well as requests and their arguments to the smart contracts. In some embodiments, storing a transaction or smart contract to the directed acyclic graph may include storing a record of the information of that transaction or smart contract (e.g., the program code of the logic of the smart contract that is executed by the computing nodes (e.g., in a virtual-machine) of the decentralized computing platform corresponding to a target of byte code into which smart contracts are interpreted) in content of nodes (e.g., a node in a tree of nodes, like a Merkle tree, and a given tree may be stored in a block) of the directed acyclic graph of cryptographic hash pointers. Cryptographic hash pointers pointing to those nodes include cryptographic hash values (as part of node content of the node that is pointing) that are based on node content (of the node to which the pointer points) that includes the record of stored information (e.g., transaction information or smart contract information), thereby defining a chain of cryptographic hash pointers that becomes increasingly computationally expensive to modify (while remaining internally consistent) in the event of attempted tampering as the chain increases in length or tree increases in size. In some embodiments, a plurality of different directed acyclic graphs of cryptographic hash pointers may store different subsets of the information, may store replicated instances of the information, or in some cases a single directed acyclic graph of cryptographic hash pointers may store all of this information. In some cases, the directed acyclic graph is a sub-graph of a larger graph with a cycle, and in some cases the directed acyclic graph includes unconnected subgraphs. For example, different types of transactions or smart contracts may be stored in different sub-graphs of the directed acyclic graph.

In some embodiments, recording of information like a transaction (which may correspond to storage of form record information or a generated token for a corresponding certified form and associated criteria or information by which the resulting determinations (e.g., to store or generate) were made, transfer of tokens or transfer of funds or other criteria or information may which the resulting determinations (e.g., transfer token ownership or funds) were made) to the directed acyclic graph of cryptographic hash pointers is achieved by storing a digest of the information in node content of the directed acyclic graph of cryptographic hash pointers. In some cases, the digest may include some plaintext information, such as form data, and cryptographic hashes of other information, or all plaintext or all cryptographic hashes. In some examples, one or more of the cryptographic hashes in a cryptographic hash portion of the digest may reference other content, like records, transactions, or tokens within other nodes of the data store, e.g., an update may include a hash digest referencing prior updates and a token or certified form. The cryptographic hashes included in record or token information may be operable to identify (e.g., other transactions in other nodes by cryptographic hash pointer) or verify information (e.g., on-chain or off-chain information by cryptographic hash) associated with the transactions.

In some embodiments, a transaction may include one or more public keys, user account identifiers, or representations (e.g., a hash) of such information or other information stored outside of the data store. In some embodiments, a public key may be considered a representation of a credential (e.g., a private key) because it is representative of some other knowledge (the private key) held in confidence by a user or entity without being exposed. Data, and a signature of the data as signed by the private key, may be exposed for signature verification (e.g., by a signature verification function that takes as input the signature, the data that was signed, and the public key and outputs a verification that the signature was generated based on the private key of a key-pair of the private key and the public key) as proof that the user or entity has access to the private key. In some embodiments, a public key may be a user account identifier or an identifier of an entity (e.g., user associated with the form, certifying user associated with a certification authority), as that public key corresponds to a private key retained by a given user or entity.

Information stored outside of the data store (and within) may be verified as having been untampered with based on matching of cryptographic hashes. For example, a cryptographic hash of certified form may be associated with a token. A given certified form may be verified as corresponding to the token recalculating a cryptographic hash value of the given certified form and verification of a match with the cryptographic hash associated with the token (e.g., which may have been computed in association with the generation of the token). Upon determining that the hash values match, the certified form may be determined to have not been subject to tampering (e.g., can be verified), or upon determining that the values do not match, it may be determined to have been tampered with (e.g., cannot be verified). Further, to verify that a cryptographic hash value in the data store has not been tampered with, some embodiments may recalculate cryptographic hash values along a chain of cryptographic hash pointers to confirm that the recalculated values match those in the directed acyclic graph (e.g., can be verified), thereby indicating the absence of tampering (or upon detecting a mismatch, indicating the presence of tampering and cannot be verified).

For example, content of nodes of a directed acyclic graph, e.g., of cryptographic hash pointers, may be verified as having not been subject to tampering by determining whether that content is consistent with one or more chains, or other associative data structures (e.g., forms), of cryptographic hash pointers of the directed acyclic graph. In some embodiments, nodes of the directed acyclic graph of cryptographic hash pointers may include as node content a node identifier (e.g., an address in the graph) that distinguishes a node from other nodes of the graph, identifiers or one or more other nodes of the graph to which a cryptographic hash pointer of that node points, and an associated cryptographic hash values based on node content of those other identified nodes to which the cryptographic hash pointers point (in some cases, the pointing is from one and only one node to one and only one node for adjacent nodes). As additional nodes are appended to the directed acyclic graph, a chain of cryptographic hash pointers may be formed such that each subsequent node includes as node content one or more cryptographic hash values based upon some, and in some cases all of the previously published information published to the directed acyclic graph of cryptographic hash pointers.

In some embodiments, the user may request the tamper-evident data storage service to store the form in the distributed computing platform 140. The application server 120 or the computing node 141 may store the form or a cryptographic hash thereof in the blockchain (e.g., indicated by transaction Tx1 in block 11). In some embodiments, an address of a smart contract may be called with an API call to perform one or more verifications, such as signature verifications, based on PKI information, prior to storing the form in the tamper-evident data storage service. For example, verification may include verifying a signature associated with the request, such as whether the form is signed by the user (or another entity) requesting the storage. The smart contract may verify the authenticity of the form by using a public key of the user (or another entity) associated with the form. In some embodiments, a signature corresponding to a signature authority (e.g., like the application server) may be required along with a signature corresponding to an entity (e.g., the user associated with the form), where the signature authority verifies the identity of the entity. In some embodiments, the verifying requirements includes verification of the signature of the signature authority. In this way, transaction processing may be restricted to only requests deemed reputable.

If the requirements are not verified, the request for storing the form in the tamper-evident data storage may be rejected. The rejection may specify the requirements not met during verification. If the requirements are verified, the request may be effected as a transaction in blockchain. For example, one or more transactions effecting the request may be published to a tamper-evident, immutable, decentralized data store. For example, the form 171 may be stored (e.g., published) to the data store or blockchain (e.g., Tx1 in block 11). The form in the unified schema may be formatted into a data structure, like XML or JSON code, or a vector, and stored (e.g., published) to the data store or blockchain. After the form 171 has been stored in the blockchain, the tamper-evident data storage service returns the results to the application server. In some cases, returning the result includes monitoring the blockchain to determine that the transactions have been published. In some cases, returning a result includes monitoring the blockchain to determine that the transactions have been published to a block of the blockchain and are considered authoritative. The returned result may include one or more of a transaction ID, form ID, and other identifiers.

Further, in some embodiments, storing the form 171 in the blockchain may trigger a smart contract to obtain a cryptographic signature of a certification authority that is indicative of a certification of the form 171. The certification authority may certify the form with a cryptographic signature (e.g., a private key of a private key-public key pair associated with the certification authority) and submit the form 171 with the cryptographic signature. The smart contract 145 may verify the cryptographic signature of the certification authority (e.g., using the public key of the certification authority). After the signature is verified (e.g., the public key corresponds to the private key of the certification authority), a record of the certified form 172 may be established in the blockchain. For example, the certified form 172 (which may be a combination of form 171 and cryptographic signature of the certification authority) may be stored (e.g., published) to the data store or blockchain (e.g., Tx2 in block 11). In some embodiments, the cryptographic signature of the certification authority may be stored (instead of the certified form 172) and linked to the form 171 (or a cryptographic hash thereof) for which the certification was obtained.

Further, in some embodiments, a cryptographic token 173 representative of a certified form agreement may be generated after the form is certified. For example, a token 173 representative of a specific bond (e.g., certified form agreement) that issues out of the certified bond-issuance request form (e.g., certified form 172) may be generated and stored in the blockchain. Further, the generated token may be linked to the certified form 172 or the cryptographic signature of the certification authority associated with the form 171 indicating a correspondence of the token to the form 171. The blockchain may store tokens corresponding to multiple such certified forms of one or more users. The users (e.g., issuers of the bond) may view the token IDs of the tokens they own in a digital wallet accessible via the mobile device 101 or a browser 119.

In some embodiments, users of the tamper-evident data store may engage in trading the tokens. For example, buyers interested in buying the bonds may buy the tokens representative of the bonds. In some embodiments, a smart contract may be triggered to execute the transaction between two entities. The smart contract may verify requirements for executing the requested transaction. For example, requirement verification may include determining whether transaction fees are available for processing the transaction. This may include checking that a balance of a wallet associated with the entity requesting the transaction (e.g., buyer of the bond) has available funds to cover the transaction costs. In some embodiments, the verifying requirements includes verifying a cryptographic signature of a certification authority that certified the bond. Some embodiments may verify a cryptographic signature of a user associated with the bond (e.g., issuer of the bond). Additionally, availability of funds equal or greater to the determined cost in a digital wallet associated with requestor (e.g., buyer) may be verified. After the verification is successful, the transaction may be effected in the blockchain. For example, the transaction Tx5 in block 12 which is indicative of the user of user account A 174 (e.g., issuer of the bond) transferring the token (corresponding to the bond) to a user account B 175 (e.g., buyer of the bond), thereby conveying possession of the token to another user, may be published to the data store.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 2:
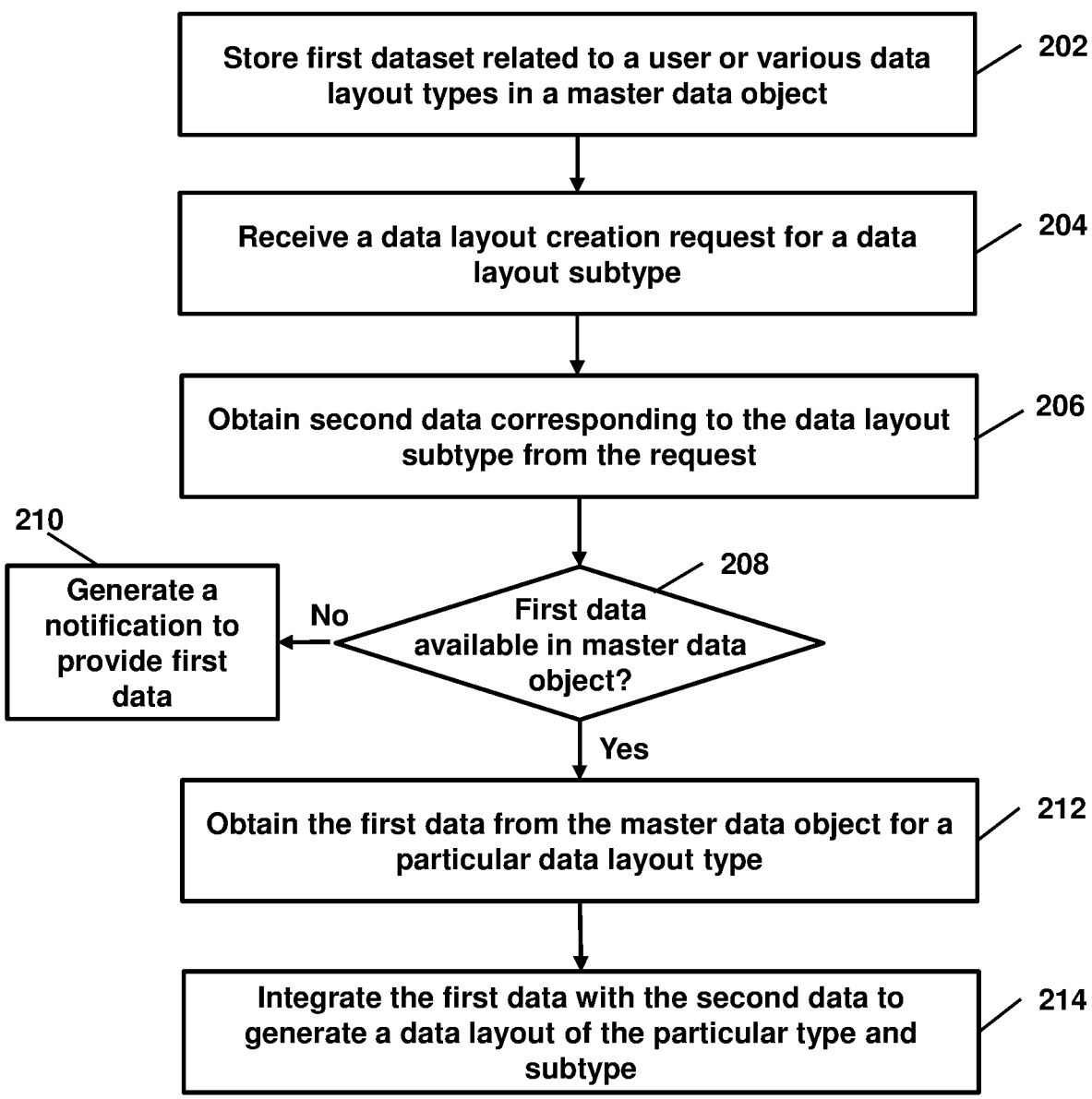
FIG. 2 is a flow diagram of a method of generating a form using data reuse computing architecture, in accordance with one or more embodiments.

FIG. 2 shows a method 200 of generating a form using data reuse computing architecture, in accordance with one or more embodiments. For example, method 200 may comprise steps performed by an improved processing architecture in networked computer systems. In particular, method 200 may include a new function routine that configures a master data object 135 to store request-agnostic data, which is typically that portion of form data that does not differ, or is common, between various electronic forms that may be created by a user, and facilitates generation an electronic form by automatically integrating the request-agnostic data with request-specific data, which is specific to a form being created, obtained from a form generation request. In an operation 202, the application server 120 stores request-agnostic data (e.g., first data) in a master data object.

As described above, the request-agnostic data is typically that portion of form data that does not differ, or is common, between various electronic forms that may be created by a user. For example, if the forms being generated are of various types and subtypes, and each form generation request for generating a form differs in the subtype of the form being generated, the request-agnostic data may include (a) information associated with a user (e.g., user profile data such as contact information of the user, user identification, organization information of the user, etc.) and information associated with the types of forms (e.g., a first type, a second type, information describing various aspects of the types of forms, or such information). For example, if the form generation is being implemented in a computer system that facilitates generation of a bond-issuance request form associated with an issuance of a bond, the request-agnostic data may include information associated with an issuer of the bond (e.g., identification information of the issuer, including user profile data, such as an organization name, contact information of personnel of the organization, address, or other such information), information associated with form types (e.g., standards bodies with which the bond complies), information describing various aspects of the standards bodies, information describing how the bond complies with each of the standards bodies, or other such information. The request-agnostic data may be stored in a master data object, such as the master data object 135 in a data store 160. The master data object 135 may be implemented as a data structure (e.g., database table). The user may input the request-agnostic data via a GUI (e.g., generated by the API 125) that may be accessed via a browser 119 or the native application 105. In some embodiments, the request-agnostic data, or at least a portion of it, may be input as natural language text.

In an operation 204, the application server 120 receives a form generation request for generating a form. In some embodiments, the form generation request may be for generating a form of a first subtype of a first type.

In an operation 206, the application server 120 obtains the request-specific data (e.g., second data) from the form generation request. As described above, the request-specific data may include a portion of form data that is specific to the form being generated and is different for different forms. For example, the request-specific data may include information associated with the particular subtype of the form being generated. Continuing with the example of bond issuance, the user may issue different form generation requests for different bond issuances, and each form generation request may generate a bond-issuance request form for the corresponding bond issuance. For example, the request-specific data may include information associated with the first subtype (e.g., an outcome or category within a first standards body) of a specific bond issuance for which the generation of bond-issuance request form is being requested. The request-specific data may also include information describing how the bond is directed to such an outcome or category, identification information of a verifying entity that verifies the compliance of the bond-issuance request form with the standards body guidelines, or other such information. The user may input the request-specific data via a GUI (e.g., generated by the API 125) that may be accessed via a browser 119 or the native application 105. In some embodiments, the request-specific data, or at least a portion of it, may be input as natural language text.

In an operation 208, the application server 120 may determine whether request-agnostic data associated with the user is available in the master data object. For example, the application server 120 may query the data store 160 to determine if the master data object 135 has request-agnostic data associated with the user and for the first type of the form.

If the application server 120 determines that the request-agnostic data is not available in the master data object, in an operation 210, the application server 120 may generate a notification indicating the user to generate the request-agnostic data and the method 200 may end without generating the form. The notification may also include a link (e.g., uniform resource locator (URL)) to the GUI where the user may provide the request-agnostic data. The user may select the link to render the GUI (e.g., in the browser 119 or native application 105), and may input the request-agnostic data in the GUI.

If the application server 120 determines that the request-agnostic data is available in the master data object, in an operation 212, the application server 120 obtains the request-agnostic data for the first type of the form from the latest version of the master data object 135. Continuing with the bond issuance example, the request-agnostic data obtained may include information associated with an issuer of the bond, information associated with a first form type (e.g., a first standards body with which the bond complies), information describing various aspects of the first standards body, information describing how the bond complies with the first standards body, or other such information.

In an operation 214, the application server 120 integrates the request-agnostic data with the request-specific data to generate the form of the first type and first subtype. The application server 120 may generate the form in various formats. For example, the application server 120 may generate the form as a document, such as document in a portable document format (PDF). In another example, the application server 120 may generate the form as a webpage or other GUI.

Figure 3:
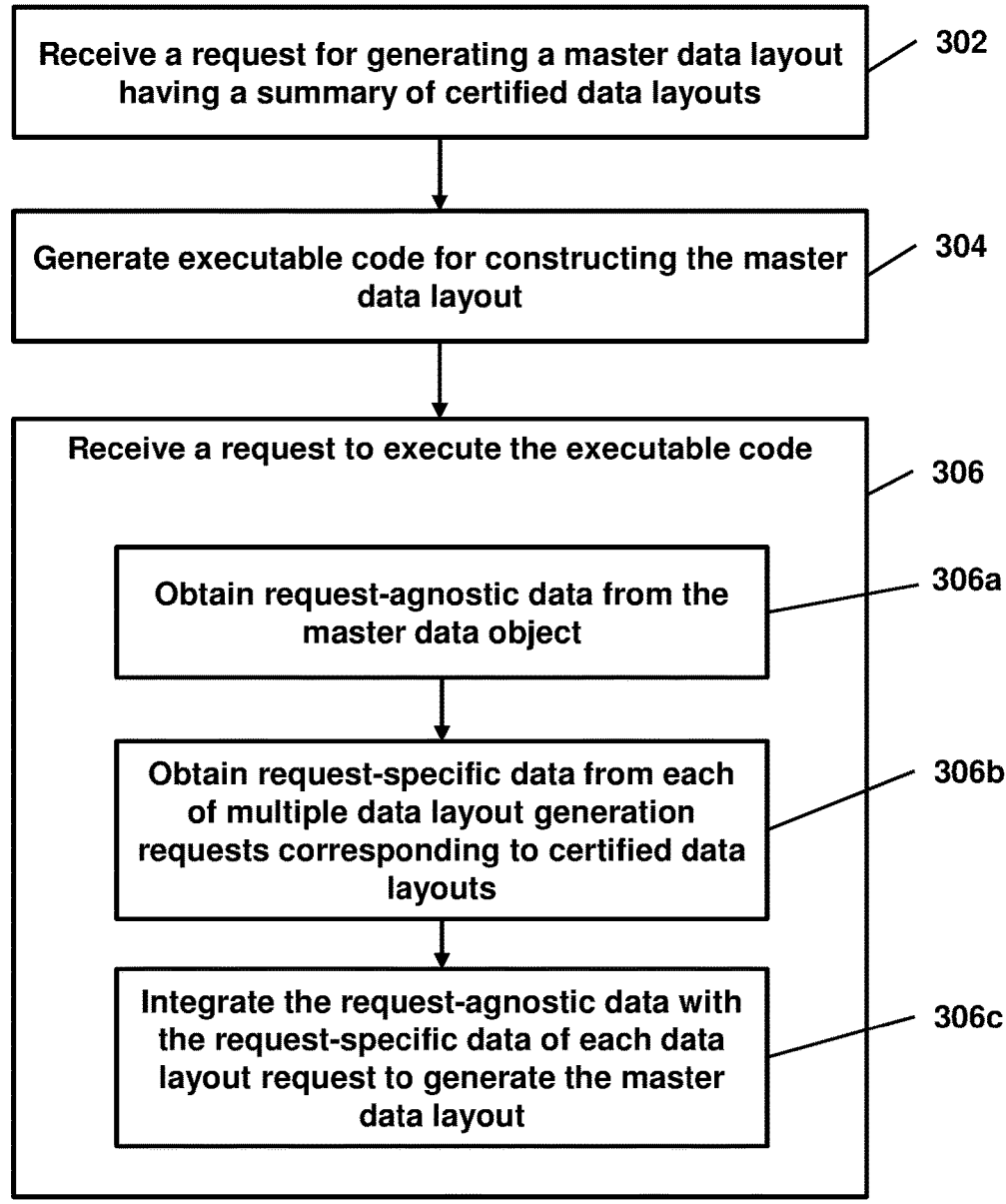
FIG. 3 is a flow diagram of a method of generating a master form to provide a summary of certified forms associated with a user, in accordance with one or more embodiments.

FIG. 3 shows a method 300 of generating a master form to provide a summary of certified forms associated with a user, in accordance with one or more embodiments. In an operation 302, the application server 120 receives a request for generating a master form that provides a summary of all the approved/certified forms associated with a user.

In an operation 304, the application server 120 generates an executable code, which when executed, generates a master form that provides a summary of the certified/approved forms associated with the user and the information associated with each of the certified forms. The application server 120 may be configured to generate the executable code in any programming language.

In an operation 306, the application server 120 receives a request to execute the executable code. The application server 120 executes the executable code. In response to the execution, the application server 120 performs the operations 306a-306c to generate the master form.

In an operation 306a, the application server 120 obtains the request-agnostic data from the latest submitted version of the master data object 135, such as information corresponding to a user associated with the form, information describing various aspects of the types of the certified forms, or other such information.

In an operation 306b, the application server 120 obtains the request-specific data from each of the multiple form generation requests corresponding to the certified forms. For example, the request-specific data may include information such as information describing various aspects of the one or more subtypes of a certified form, or other aspects associated with the specific form generation request (e.g., verification entity associated with the specific certified form). In some embodiments, the application server 120 may obtain the request-specific data from the form request data 136.

In an operation 306c, the application server 120 integrates the request-agnostic data with the request-specific data from each of the certified forms to generate the master form. Continuing with the example of bond issuance, the master form may display a list of certified bond-issuance requests associated with an issuer and information associated with each certified form. The user may select any of the bond-issuance requests from the list and the master form may display the details of the selected bond-issuance request. In some embodiments, the master form is encoded in a standardized format. For example, the master form is encoded in JavaScript object notation (JSON), which comprises key-value pairs that encode fields and values of the fields (e.g., information) extracted from the master form. The user may access the master form by executing the executable code, which generates the master form using the JSON code. Further, the master form may be persisted in the data store 160.

Figure 4:
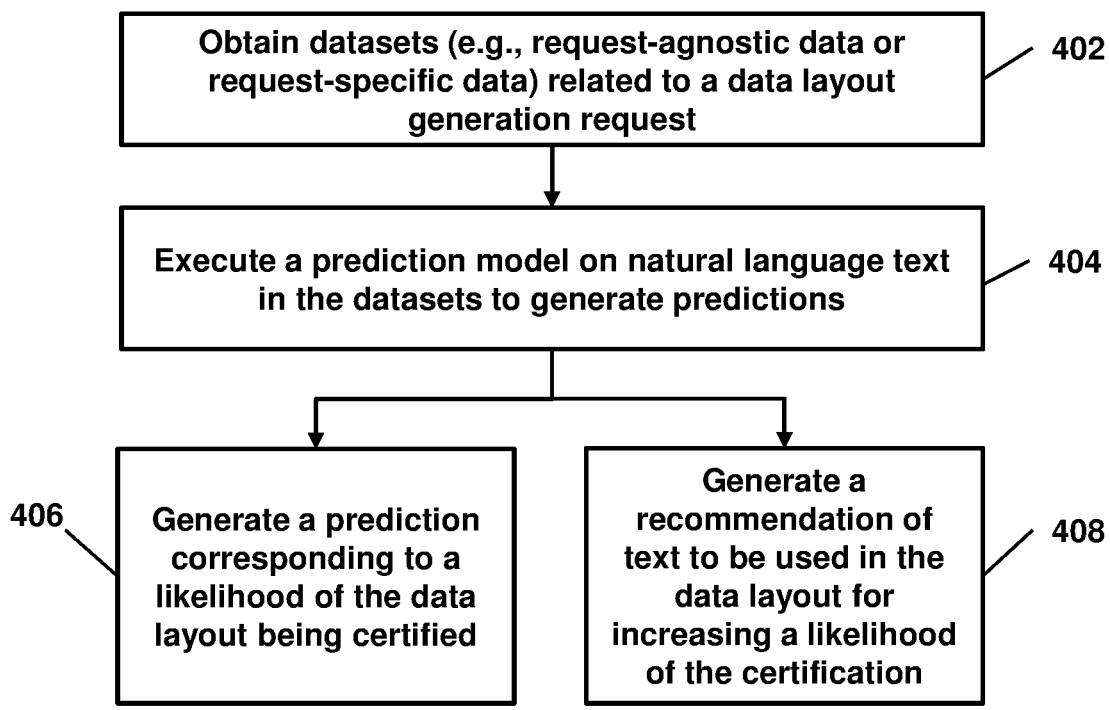
FIG. 4 is a flow diagram of a method of generating predictions related to a form, in accordance with one or more embodiments.

FIG. 4 shows a method 400 of generating predictions related to a form, in accordance with one or more embodiments. In an operation 402, the application server 120 obtains form data related to a form generation request. In some embodiments, the form data may include request-agnostic data, or request-specific data associated with the form generation request. Continuing with bond issuance example, the request-agnostic data may include information associated with an issuer of the bond, information associated with standards bodies with which the bond complies, information describing various aspects of the standards bodies, information describing how the bond complies with each of the standards bodies, or other such information. The request-specific data may include information associated with one or more outcomes or categories within each standards body a specific bond issuance for which the generation of bond-issuance request form is being requested. In some embodiments, at least a portion of the request-agnostic data and the request-specific data includes natural language text.

In an operation 404, the application server 120 may execute one or more prediction models on the form data to the prediction models to generate one or more predictions. For example, in an operation 406, a first prediction model may be executed on the form data to generate a prediction of a likelihood of the form being certified by a certification authority. Continuing with the example of bond issuance, when the first prediction model is executed on the form data (e.g., natural language text from the request-agnostic data or the request-specific data) associated with the bond-issuance request form, the first prediction model may generate the prediction of a likelihood of the bond-issuance request form being certified by a standards body.

In some embodiments, the first prediction model is trained to generate a likelihood of certification of the form by training the first prediction model with a training set having form data of forms that are identified as certified by the certification authority. The first prediction model may be trained using a number of NLP-based machine learning (ML) models. For example, the first prediction model may be trained using a supervised classification model architecture, Siamese network with triplet loss architecture (e.g., when the number of training examples available is less than a threshold), or other such architectures. The first prediction model may output the prediction in a number of formats. In some embodiments, the first prediction model may generate the prediction as a classification by classifying the form generation request into "certifiable" or "non-certifiable." In some embodiments, the first prediction model may generate the prediction as a probability of certification by the certification authority (e.g., 90% likelihood that the form generation request is certified). The prediction may be provided as an output to the user via a GUI (accessible via the browser 119 or the native application 105) associated with the prediction service.

In an operation 408, a second prediction model may be executed on the form data (e.g., natural language text derived from the request-agnostic data or the request-specific data) to generate a recommendation of text to be used in the form data to increase a likelihood of the form being certified by a certification authority. Continuing with the example of bond issuance, the second prediction model may execute on the form data (e.g., natural language text derived from the request-agnostic data or the request-specific data), as the user is inputting the form data, to generate a recommendation of text (e.g., certain words or phrases based on what the user has input so far) to be included in the form data to increase a likelihood of the bond-issuance request form being certified by a standards body. The user may choose to accept or ignore the recommended text.

In some embodiments, the second prediction model is trained to generate a recommendation of text to increase a likelihood of certification of the form. The second prediction model may be trained using a number of NLP-based ML models. For example, the second prediction model may be trained using a generative prediction model, such as GPT-3. In some embodiments, a GPT-3 based prediction model is an autoregressive language model that uses deep learning to produce human-like text. Such a prediction model may be a pretrained prediction model, which is trained using a process known as generative pre-training with wide variety of content (e.g., corpora of textual content available from the Internet, such as Wikipedia, books, or other such content) for predicting text. Such pre-trained models may be further primed or fine-tuned for performing a specific task. For example, by providing form data (e.g., natural language text derived from the request-agnostic data or the request-specific data) associated with forms that are identified as certified as examples to the pre-trained prediction model, the second prediction model may be configured or primed to predict text that is likely to increase a likelihood of the form being certified.

Figure 5:
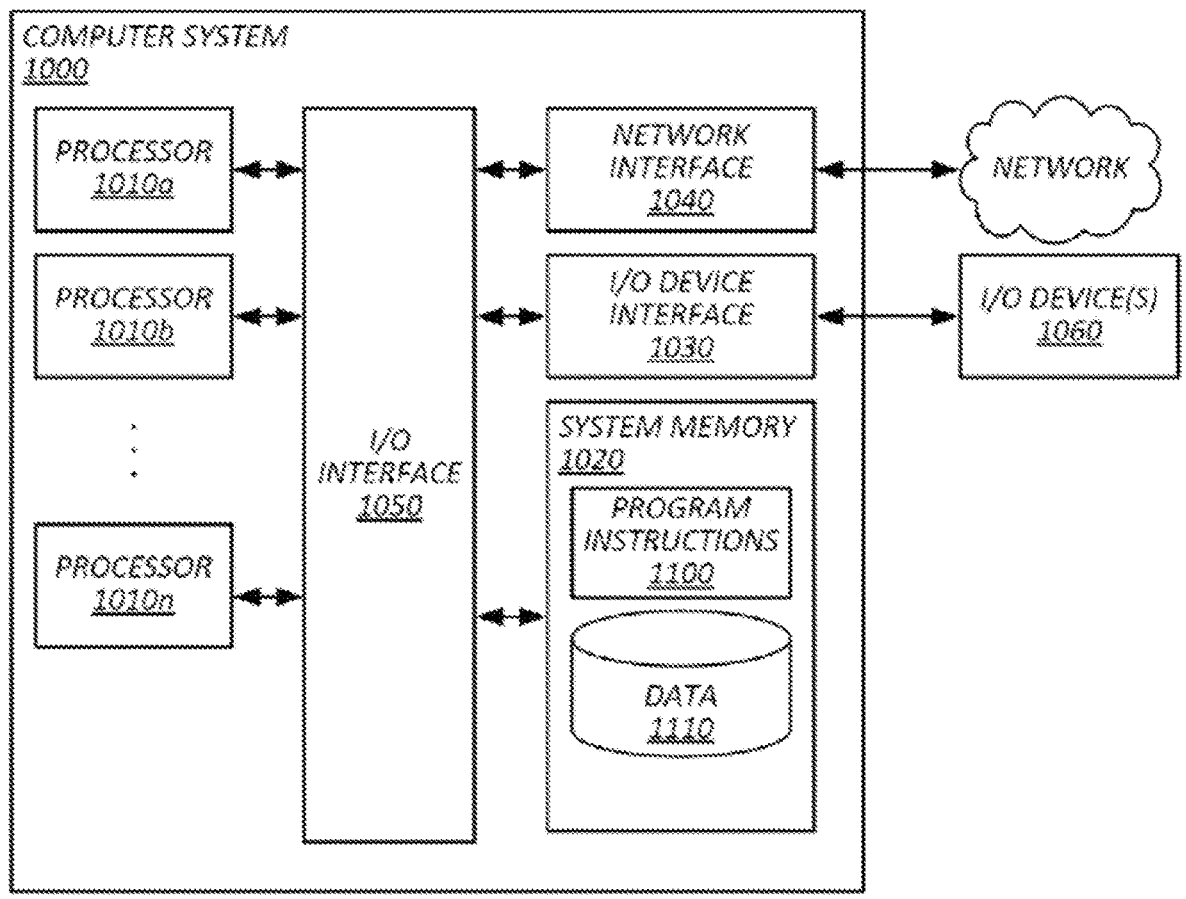
FIG. 5 is a block diagram of an example computing device with which the above-described techniques may be implemented in accordance with some embodiments.

Some embodiments may execute the above operations on a computer system, such as the computer system of FIG. 5, which is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A computer-implemented method for generating data layouts using data-reuse computing architecture, wherein the data-reuse computing architecture comprises a master data object storing information that is reused for generating data layouts of multiple types, the method comprising:
   storing, with one or more processors, a first dataset as a master data object in a version-based data storage, the first dataset including information related to a user associated with data layouts of one or more types;
   receiving, with one or more processors, a first data layout creation request for generation of a first data layout of a first type and one or more subtypes of the first type, the first data layout creation request including a second dataset that comprises information specific to the one or more subtypes of the first type, the second dataset being a portion of the first data layout; and
   in response to receiving the first data layout creation request, generating, with one or more processors, the first data layout, wherein generating the first data layout includes:
      obtaining the first dataset for the first type from the master data object, and
      integrating the first dataset with the second dataset to generate the first data layout.

2. The method of claim 1 further comprising:
   receiving a second data layout creation request for generation of a second data layout of a second type and one or more subtypes, the second data layout creation request including third dataset that comprises information specific to the one or more subtypes of the second type, the third dataset being a portion of the second data layout; and
   in response to receiving the second data layout creation request, generating the second data layout, wherein generating the second data layout includes:
   obtaining the first dataset for the second type from the master data object, and
   integrating the first dataset with the third dataset to generate the second data layout.

3. The method of claim 1 further comprising:
   generating a workflow request associated with the first data layout, the workflow request:
      providing the first data layout to a verifying entity to verify the first data layout, wherein the information associated with the verifying entity is provided in the first data layout creation request, and
      in response to receiving an approval from the verifying entity, providing the first data layout to a certification authority to certify the first data layout.

4. The method of claim 1 further comprising:
   generating executable code for constructing a summary of a plurality of certified data layouts associated with the user, wherein the executable code is configured to:
      obtain the first dataset from the master data object,
      obtain, from each of a plurality of data layout creation requests associated with the plurality of certified data layouts, dataset corresponding to one or more subtypes of the corresponding certified data layout, and
      integrate the first dataset with the dataset associated with the plurality of data layout creation requests to generate a master data layout, the master data layout comprising data corresponding to each of the plurality of certified data layouts and a user associated with the plurality of certified data layouts.

5. The method of claim 4 further comprising:
   encoding the master data layout in a standardized format, wherein the standardized format comprises key-value pairs that encode fields and values of the fields extracted from the master data layout in JavaScript object notation (JSON).

6. The method of claim 1, wherein generating the first data layout includes:
   obtaining, from the version-based data storage, a latest version of the master data object for use in generating the first data layout.

7. The method of claim 1, wherein storing the master data object includes:
   determining that the first dataset is being modified by a first user and a second user concurrently to generate multiple records of the first dataset for storage in the version-based data storage,
   resolving a conflict between the records by selecting a first record of the records submitted to the version-based data storage, and
   storing the first record as a latest version of the master data object.

8. The method of claim 1 further comprising:
   storing the first data layout or a cryptographic hash of the first data layout in a tamper-evident data storage.

9. The method of claim 8 further comprising:
   triggering, in response to storing the first data layout in the tamper-evident data storage, a smart contract in the tamper-evident data storage to obtain a cryptographic signature of a certification authority that is indicative of a certification of the first data layout.

10. The method of claim 9 further comprising:
    storing the cryptographic signature in the tamper-evident data storage.

11. The method of claim 1 further comprising:
    receiving a request to establish a certified data layout record, the request comprising a certified data layout, a cryptographic signature of the certified data layout, and a first public key of a first cryptographic key pair by which the certified data layout was signed;
    determining whether to establish the certified data layout record based on a correspondence of the first public key to a certification authority and a verification of the cryptographic signature based on the first public key and the certified data layout; and
    in response to determining to establish the certified data layout record, publishing, to a tamper-evident decentralized data store, the certified data layout record, the certified data layout record comprising at least the certified data layout, the tamper-evident decentralized data store comprising a plurality of certified data layout records established for respective certified data layouts.

12. The method of claim 1 further comprising:
receiving a request to tokenize a certified data layout agreement record, the request comprising data corresponding to ownership of an agreement associated with a certified data layout, a cryptographic signature of the data corresponding to ownership of the agreement, and a second public key of a second cryptographic key pair by which the data was signed;
determining whether to generate a unique token corresponding to an established certified data layout agreement record by which an indication of ownership of the agreement is conveyed among users of a tamper-evident decentralized data store based on a correspondence of the second public key to an owner of the agreement and a verification of the cryptographic signature based on the second public key and the data corresponding to the ownership of the agreement; and
in response to determining to generate the unique token, publishing, to the tamper-evident decentralized data store, a unique identifier of a new agreement token, as association of the unique identifier of new agreement token with the established certified data layout agreement record, and an indication of a transfer of the new agreement token to an address associated with a digital wallet of the owner.

13. The method of claim 1 further comprising:
obtaining a training set having dataset associated with a first plurality of data layouts that are identified as certified, the training set including natural language text derived from the dataset;
causing a prediction model to be trained based on the training set, wherein the prediction model, when trained, is configured to classify natural language text as certifiable or non-certifiable;
obtaining natural language text from the first data layout;
classifying, using the prediction model, based on the natural language text, the first data layout as certifiable or non-certifiable; and
causing an output to be provided to the user, the output being based on whether the first data layout is classified as certifiable or non-certifiable.

14. The method of claim 1 further comprising:
obtaining a first training set having third dataset associated with a first plurality of data layouts that are identified as certified, the first training set including natural language text derived from the third dataset;
obtaining a second training set having fourth dataset associated with a second plurality of data layouts that are identified as certified, the second training set including the natural language text derived from the fourth dataset;
obtaining a third training set having fifth dataset associated with a third plurality of data layouts that are identified as rejected, the second training set including natural language text derived from the fifth dataset;
causing a prediction model to be trained based on the first training set, the second training set, and the third training set, wherein the prediction model, when trained, is configured to classify natural language text as certifiable or non-certifiable;
obtaining natural language text from the first data layout; and
classifying, using the prediction model, based on the natural language text, the first data layout as certifiable or non-certifiable.

15. The method of claim 14, wherein:
the prediction model is caused to be trained by:
determining a first loss as a difference between a vector representation of natural language text from the first training set and a vector representation of natural language text from the second training set,
determining a second loss as a difference between a vector representation of natural language text from the first training set and a vector representation of natural language text from the third training set, and
adjusting the prediction model to minimize the first loss and maximize the second loss.

16. The method of claim 1 further comprising:
obtaining a training set having third dataset associated with a plurality of data layouts that are identified as certified, the training set including natural language text derived from the third dataset;
causing, a prediction model that is pretrained with a corpora of natural language text to predict a next word for a given set of words, to be trained with the training set, wherein the prediction model, when trained, is configured to predict natural language text that has a likelihood of being certified by a certification authority;
obtaining natural language text from the first dataset;
generating, with the prediction model, based on the natural language text, a predicted text that has a likelihood of being certified; and
causing an output to be provided to the user, the output being the predicted text.

17. The method of claim 1, wherein:
the first data layout includes a bond-issuance request data layout corresponding to a bond to be issued by an issuer,
the first type includes data corresponding to a standards body the bond complies with,
the one or more subtypes includes a bond category, and
the first dataset includes data corresponding to the issuer.

18. The method of claim 1 further comprising:
means for generating a bond-issuance request data layout corresponding to a bond to be issued by an issuer, the bond-issuance request data layout comprising data corresponding to an issuer, a standards body the bond complies with, and a bond category;
means for obtaining a certification of the bond-issuance request data layout from the standards body; and
means for generating portfolio data of an issuer, the portfolio data comprising data corresponding to the issuer and data corresponding to a list of bonds certified by the standards body.

19. A system for generating data layouts using data-reuse computing architecture, wherein the data-reuse computing architecture comprises a master data object storing information that is reused for generating data layouts of multiple types, the system comprising:
a computer system comprising one or more processors programmed with computer program instructions that, when executed, cause operations comprising:
storing request-agnostic data as a master data object in a data storage, the request-agnostic data including information related to a user associated with data layouts of one or more types;
receiving a first data layout creation request for generation of a first data layout of a first type and one or more subtypes of the first type, the first data layout creation request including request-specific data that comprises information specific to the one or more subtypes of the first type, the request-specific data being a portion of the first data layout; and in response to receiving the first data layout creation request, generating the first data layout, wherein generating the first data layout includes:
obtaining the request-agnostic data for the first type from the master data object, and
integrating the request-agnostic data with the request-specific data to generate the first data layout.

20. A non-transitory computer-readable medium comprising instructions that, when executed by one or more processors, cause operations comprising:

storing request-agnostic data as a master data object in a data storage, the request-agnostic data including information related to a user associated with data layouts of one or more types;

receiving a first data layout creation request for generation of a first data layout of a first type and one or more subtypes of the first type, the first data layout creation request including request-specific data that comprises information specific to the one or more subtypes of the first type, the request-specific data being a portion of the first data layout; and in response to receiving the first data layout creation request, generating the first data layout, wherein generating the first data layout includes:
obtaining the request-agnostic data for the first type from the master data object, and
integrating the request-agnostic data with the request-specific data to generate the first data layout.

21. The computer-readable medium of claim 20, wherein the operations further comprise:

generating a workflow request associated with the first data layout, the workflow request:
providing the first data layout to a verifying entity to verify the first data layout, wherein the information associated with the verifying entity is provided in the first data layout creation request, and
in response to receiving an approval from the verifying entity, providing the first data layout to a certification authority to certify the first data layout.

22. The computer-readable medium of claim 20, wherein the operations further comprise:

generating executable code for constructing a summary of a plurality of certified data layouts associated with the user, wherein the executable code is configured to:
obtain the request-agnostic data from the master data object,
obtain, from each of a plurality of data layout creation requests associated with the plurality of certified data layouts, dataset corresponding to one or more subtypes of the corresponding certified data layout, and
integrate the request-agnostic data with the dataset associated with the plurality of data layout creation requests to generate a master data layout, the master data layout comprising data corresponding to each of the plurality of certified data layouts and a user associated with the plurality of certified data layouts.

23. The computer-readable medium of claim 20, wherein the operations further comprise:

receiving a request to establish a certified data layout record, the request comprising a certified data layout, a cryptographic signature of the certified data layout, and a first public key of a first cryptographic key pair by which the certified data layout was signed;

determining whether to establish the certified data layout record based on a correspondence of the first public key to a certification authority and a verification of the cryptographic signature based on the first public key and the certified data layout; and in response to determining to establish the certified data layout record, publishing, to a tamper-evident decentralized data store, the certified data layout record, the certified data layout record comprising at least the certified data layout, the tamper-evident decentralized data store comprising a plurality of certified data layout records established for respective certified data layouts.

24. The computer-readable medium of claim 20, wherein the operations further comprise:

obtaining a training set having first dataset associated with a first plurality of data layouts that are identified as certified, the training set including natural language text derived from the first dataset;

causing a prediction model to be trained based on the training set, wherein the prediction model, when trained, is configured to classify natural language text as certifiable or non-certifiable;

obtaining natural language text from the first data layout;

classifying, using the prediction model, based on the natural language text, the first data layout as certifiable or non-certifiable; and causing an output to be provided to the user, the output being based on whether the first data layout is classified as certifiable or non-certifiable.

25. The computer-readable medium of claim 20, wherein the operations further comprise:

obtaining a first training set having first dataset associated with a first plurality of data layouts that are identified as certified, the first training set including natural language text derived from the first dataset;

obtaining a second training set having second dataset associated with a second plurality of data layouts that are identified as certified, the second training set including natural language text derived from the second dataset;

obtaining a third training set having third dataset associated with a third plurality of data layouts that are identified as rejected, the second training set including natural language text derived from the third dataset;

causing a prediction model to be trained based on the first training set, the second training set, and the third training set, wherein the prediction model, when trained, is configured to classify natural language text as certifiable or non-certifiable;

obtaining natural language text from the request-agnostic data; and classifying, using the prediction model, based on the natural language text, the request-agnostic data as certifiable or non-certifiable.

26. The computer-readable medium of claim 20, wherein the operations further comprise:

obtaining a training set having dataset associated with a plurality of data layouts that are identified as certified, the training set including natural language text derived from the dataset;

causing, a prediction model that is pretrained with a corpora of natural language text to predict a next word for a given set of words, to be trained with the training set, wherein the prediction model, when trained, is configured to predict natural language text that has a likelihood of being certified by a certification authority;

obtaining natural language text from the request-agnostic data;
generating, with the prediction model, based on the natural language text, a predicted text that has a likelihood of being certified; and
causing an output to be provided to the user, the output being the predicted text.

\* \* \* \* \*